3,825,601
HYDROFORMYLATION OF INTERNAL OLEFINS
Leonard E. Rennick, Philadelphia, Pa., assignor to Sun
Oil Company, Philadelphia, Pa.
No Drawing. Filed Dec. 22, 1970, Ser. No. 100,804
Int. Cl. C07c 45/08
U.S. Cl. 260—604 HF                    6 Claims

ABSTRACT OF THE DISCLOSURE

Hydroformylation of internal olefins, as opposed to terminal olefins, to produce linear aldehydes in improved yields, is achieved by the addition of a sulfonic acid-type ion exchange resin to catalysts of the formula $$Rh(H)(CO)(Ph_3P)_3,$$

where Ph is phenyl.

BACKGROUND OF THE INVENTION

This invention relates to a method for the hydroformylation of olefins. More particularly, it relates to the production of linear aldehydes from internal olefins in improved yields by the addition of sulfonic acid-type ion exchange resins to known rhodium hydroformylation catalysts.

The hydroformylation of olefins (the oxo process), using cobalt catalysts, the produce alcohols and aldehydes is a well-known process. See, for example, Kirk-Othmer, Encyclopedia of Chemical Technology, 14, 373, 2nd Ed. Recent work by Slaugh (U.S. Pat. No. 3,448,157), has taught that phosphine-modified cobalt catalysts permit this process to be carried out under milder reaction conditions than those employed with known cobalt catalysts. More recently, Wilkinson et al. disclosed in J. Chem. Soc. (A), 3134 (1968) that rhodium catalysts such as $Rh(H)(CO)(Ph_3P)_3$ are effective hydroformylation catalysts having high selectivity for the formation of linear aldehydes when terminal olefins are employed as the starting material. (By "terminal olefins" is meant a monoolefin or non-conjugated diolefin containing double bonds between the $C_1$ and $C_2$ carbon atoms.) These catalysts permit the use of somewhat milder reaction conditions than do the phosphine-modified cobalt catalysts, and are thus highly desirable for this purpose. However, these catalysts do not produce linear aldehydes from internal olefins. (By "internal olefins" is meant a monoolefin or non-conjugated diolefin having double bonds at positions other than at the $C_1$ and $C_2$ carbon atoms. When hydroformylated, these olefins normally yield branch-chain aldehydes.) Since the linear aldehydes are commercially more valuable than the branch-chain aldehydes normally obtained from the internal olefins, and since further internal olefins comprise a substantial portion of mixed olefin feedstocks for the oxo process, it would be highly desirable if a method could be found whereby said internal olefins could be hydroformylated in such a way as to selectively provide the more valuable linear aldehydes.

SUMMARY OF THE INVENTION

It has now been found, in accordance with the present process, that linear aldehydes may be produced in improved yields by the hydroformylation of internal olefins when there is employed in combination with known hydroformylation catalysts a co-catalyst selected from those solid catalysts which rapidly isomerize olefins but which do not hydrogenate the same. Thus, such co-catalysts as Amberlyst 15 (a sulfonic acid-type styrene-divinylbenzene co-polymer resin made by Rohm & Haas, Philadelphia, Pa) and like sulfonic acid-type cationic exchange resins may be employed in the practice of this invention, of which the ion exchange resins are preferred.

DESCRIPTION OF THE INVENTION

The hydroformylation process of this invention may be carried out in a generally conventional manner by reacting the internal olefin feedstock with hydrogen and carbon monoxide at elevated pressures and temperatures in the liquid phase using the novel catalyst combination of this invention to produce linear aldehydes which may then be reduced to form alcohols.

The internal olefin starting materials comprise any straight chain $C_4$–$C_{20}$ olefin having one or more double bonds in positions other than those attached to the terminal carbon atoms. Although mixtures of internal olefins may be employed, preferably, these olefins should comprise those $C_{11}$–$C_{14}$ monoolefins having double bonds at the $C_2$–$C_3$ carbon atoms, i.e. at positions adjacent the terminal carbon atoms. Thus, for example, included amongst the internal olefin starting materials are such compounds as 2-hexene, 2-ocetene, 2-dodecene, 2-tridecene and the like. When these compounds are hydroformylated in accordance with the invention, there are obtained the corresponding aldehydes, such as n-heptaldehyde, n-nonaldehyde, n-tridecaldehyde and the like.

The hydroformylation catalysts include conventional cobalt catalysts such as dicobaltoctacarbonyl, phosphine-modified cobalt catalysts taught by Slaugh (supra), as well as rhodium complexes of the formula $$Rh(H)(CO)(A_3Y)_3,$$

wherein A is a $C_1$–$C_6$ alkyl group or aryl, and Y is phosphorus or arsenic. Of these, the rhodium complex catalysts are preferred.

The co-catalysts which may be employed in combination with the hydroformylation catalysts are, as enumerated above, those solid catalysts which will rapidly isomerize olefins without hydrogenating them under hydroformylation conditions. The sulfonic acid-type cation exchange resins such as Amberlyst-15 have been found to be particularly effective in carrying out the process of this invention, particularly in combination with the rhodium complex $RhH(CO)(Ph_3P)$, where Ph is phenyl.

The ratio by weight of catalyst to co-catalyst is generally in the range of from about 1:4 to 1:8 of rhodium complex to ion exchange resin while the molar ratio rhodium complex to olefin starting material is desirably about $1.5 \times 10^{-3}$, but this may be varied according to the nature of the olefin and catalyst. Thus for example, 200 mg. of Amberlyst-15 and from 20 to 50 mg. of rhodium complex may satisfactorily be employed.

The temperature may vary from about 65 to 90° C. and preferably from 70 to 80° C., while the pressure is desirably from 1 to 25 atmospheres, and preferably from 10 to 20.

A solvent may be employed, if necessary, such as benzene, toluene, chlorobenzene or other similar aromatic solvents, of which benzene is preferred.

The aldehydes are conveniently recovered from the reaction mixture by fractional distillation of said reaction mixture.

In the following example will be found specific embodiments of the invention and details employed in the practice thereof.

Example 1

A series of runs was carried out in accordance with the process of this invention whereby to a 128 ml. stainless steel Paar split ring bomb, which was stirred magnetically, was added 50 mg. (3.0 mm.) of $$Rh(H)(CO)(Ph_3P)_3,$$

4.8 ml. (2.1 mol) of 2-hexene, 0.20 g. of Amberlyst-15 and 12.8 ml. of benzene. The temperature and reaction time were varied as set forth in Table I below. An additional run containing no ion exchange resin was included for purposes of comparison, the results of which are also set forth in this table.

TABLE I

[Hydroformylation [a] of 2-hexene using Rh(H)(CO)(Ph$_3$P)$_3$ plus Amberlyst 15]

| Run | Reaction temp., °C. | Reaction time, hours | Conversion,[b] percent | Selectivity,[c] percent | CO/H$_2$ |
|---|---|---|---|---|---|
| 1[d] | 75 | 3.0 | 70 | 1.7[d] | |
| 2 | 75 | 3.0 | 40 | 21.0 | 1.1 |
| 3 | 75 | 3.0 | 53 | 16 | 1.1 |
| 4 | 100 | 3.0 | 48 | 18 | 3.0 |
| 5 | 90 | 3.5 | 81 | 14 | 1.0 |

[a] Total pressure was 300 p.s.i. (H$_2$/CO 1 (determined by mass spec).
[b] Conversion = (Products/hexene left plus products) × 100 percent; calculated from VPC.
[c] Selectivity = (linear aldehyde/total aldehydes) × 100 percent; calculated from VPC.
[d] No Amberlyst 15 was employed in this run.

What is claimed is:

1. A process for the production of linear aldehydes from internal olefins which comprises reacting a straight chain C$_4$–C$_{20}$ internal olefin having at least one double bond adjacent a terminal carbon atom with hydrogen and carbon monoxide under hydroformylation conditions in the liquid phase at a temperature of from about 65° to 90° C. and in the presence of a catalyst mixture comprising a sulfonic acid-type styrene-divinylbenzene co-polymer ion exchange resin and a rhodium complex of the formula $$Rh(h)(CO)(A_3Y)_3$$

wherein A is a C$_1$–C$_6$ alkyl group, or aryl; and Y is phosphorous or arsenic; and the weight ratio of rhodium complex to ion-exchange resin is from 1:4 to 1:8.

2. The process according to Claim 1 wherein the rhodium complex is Rh(H)(CO)(Ph$_3$P)$_3$, wherein Ph is phenyl.

3. The process according to Claim 1 wherein the olefin is a C$_4$–C$_{20}$ monoolefin.

4. The process according to Claim 3 wherein the olefin is a C$_{11}$–C$_{14}$ monoolefin.

5. The process according to Claim 1 wherein the reaction is carried out at pressures of from 1 to 25 atmospheres.

6. The process according to Claim 1 wherein the molar ratio of rhodium complex to olefin is about 1.5×10$^{-3}$.

References Cited

UNITED STATES PATENTS

| | | | |
|---|---|---|---|
| 3,578,609 | 5/1971 | Hagg et al. | 260—604 R |
| 3,487,112 | 12/1969 | Paulik et al. | 260—604 HF |
| 3,530,190 | 9/1970 | Oliver | 260—604 HF |

BERNARD HELFIN, Primary Examiner

R. H. LILES, Assistant Examiner